June 29, 1926.
L. R. ARMSTRONG
1,590,667
EMERGENCY BRAKE OPERATING LEVER FOR AUTOMOBILES
Filed Jan. 9, 1926
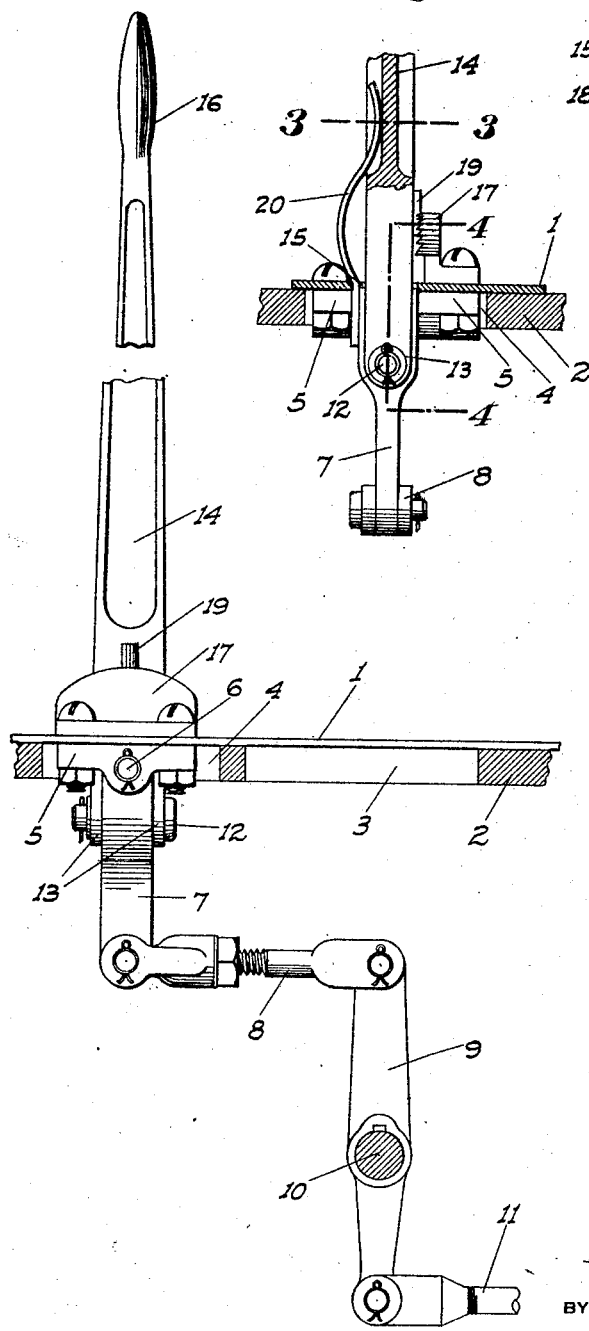
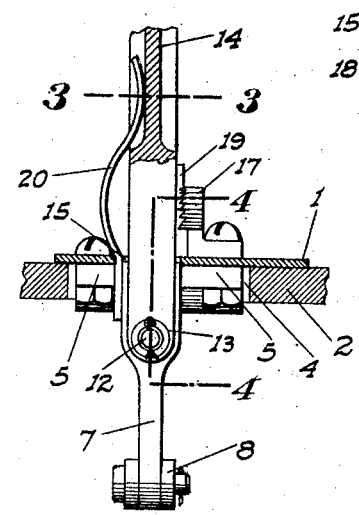
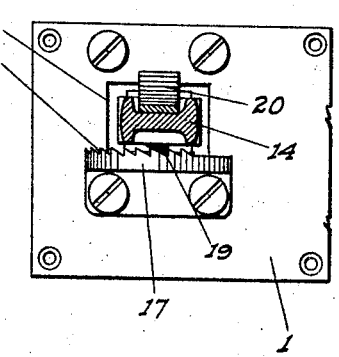
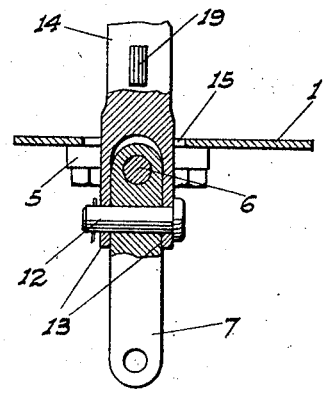
INVENTOR
*L. R. Armstrong*
BY
ATTORNEY Patented June 29, 1926.

1,590,667

UNITED STATES PATENT OFFICE.

LESTER R. ARMSTRONG, OF MODESTO, CALIFORNIA.

EMERGENCY-BRAKE-OPERATING LEVER FOR AUTOMOBILES.

Application filed January 9, 1926. Serial No. 80,157.

This invention relates to improvements in attachments for motor vehicles, and particularly to a device for operating the rear wheel brakes on Ford automobiles.

Such automobiles as they are put out by the manufacturers have hand levers for operating the rear wheel brakes. In almost all models of these cars this lever is so positioned that when the brakes are applied (as is always the case when the vehicle is stopped) the lever projects rearwardly of its pivotal point and lies somewhat across the entrance or passage-way on the driver's side of the car, making it hard for him to get in or out of the car. Further this lever requires the use of a long slot in the floor through which a draft blows continuously, to the discomfort of the driver.

The principal object of my invention therefore is to provide a brake operating means which will eliminate the present lever, and which is so arranged that when the brakes are applied, the lever is moved ahead of its pivotal point so that it is entirely clear of the side entrance of the car.

A further object of the invention is to provide a base or supporting member for the attachment so arranged that it will entirely cover up the original lever slot in the floor, thus avoiding the necessity of putting in a new section of flooring, or leaving the slot exposed.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:—

Fig. 1 is a side elevation of the device as mounted on a vehicle and attached to the brake rod.

Fig. 2 is a fragmentary end view of the attachment.

Fig. 3 is a cross section on the line 3—3 of Fig. 2.

Fig. 4 is a fragmentary vertical section on the line 4—4 of Fig. 2.

Referring now more particularly to the characters of reference on the drawings, the numeral 1 denotes the supporting or base plate of the attachment adapted to be secured onto the floor of the vehicle by suitable means, and of a size sufficient to cover the original lever slot 3 in the floor and to extend some distance ahead of said slot.

Mounted on the under side of the plate and projecting into an opening 4 cut through the floor adjacent the front end of said plate are transversely spaced bearings 5 to receive a pin 6 on which an arm 7 is mounted, said arm being adapted for movement about the pin as an axis in a fore and aft direction.

The arm projects below the pin for some distance, and is pivoted at its lower end onto one end of an adjustable link 8 of standard character, the other end of which is connected to the upper end of an arm 9 which is located entirely below the floor.

This arm is fixed intermediate its ends onto a transverse shaft 10 on the vehicle, the lower end of the arm being pivoted onto the usual brake rod 11. This shaft 10 is that on which the usual brake lever is mounted and which I remove, and the length of the arm 9 from said shaft to its connection with the rod 11 is the same as that employed with the original lever.

Between the pin 6 and the lower end of the arm 7 a longitudinal pin 12 projects through the latter. On the ends of this pin are mounted the forked arms 13 of a vertical lever 14 which projects through a slot 15 cut in the plate 1 between the bearings 5 and has a handle 16 on its upper end.

Mounted on top of the plate in transverse alinement with the lever 14 is a quadrant 17 having ratchet teeth 18 on the side thereof facing the lever, these teeth being engaged by a vertical lug or pawl 19. A vertical spring 20 is fixed at one end onto the arm 17 and bears at its other end against the face of the lever 14 opposite to the pawl to normally force the lever laterally toward the quadrant and cause the pawl to constantly engage one of the ratchet teeth. The lever of course is free for lateral swinging movement on the pin 12, such movement not imparting movement to the arm 7 nor interfering with its fore and aft movement.

In operation it will be seen that a rearward movement of the lever imparts a rear movement to the lower portion of the arm 9 and rod 11, thus releasing the brakes; and a forward movement of the lever will pull forwardly on the rod 11 thus applying the brakes. When the brakes are applied the lever is therefore in a forward position and will not project across the side entrance of the car. This clearance is further aided by the fact that the lever is mounted some distance ahead of the position occupied by the original lever. The ratchet teeth 18 are shaped so that with the forward and brake applying movement of the lever the pawl 19 may move freely past the teeth, the spring 20 of course yielding with such movement.

To release the lever and move the same rearwardly, the lever is given lateral pressure in the direction away from the quadrant, which will cause the pawl to be disengaged from the teeth and allow the lever to be drawn back without interference. This form of lever holding means is simple to operate and has no small and loose parts prone to rattle or wear out easily.

The pivot of turning of the lever structure both laterally and in a longitudinal direction being close to the plate, the opening 15 may be made very short, without interfering with the free operation of the lever, and thus provides but a small passage for wind or draft.

From the foregoing description it will be readily seen that I have produced such a device as substantially fulfills the object of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:—

A brake rod operating device for a motor vehicle having a horizontal brake rod under the floor thereof, comprising a vertical lever, operating connections between said lever and rod, a plate to be fixed on the floor of the vehicle and through which the lever projects, a pivot pin for the lever, and bearings for said pin fixed on the plate.

In testimony whereof I affix my signature.

LESTER R. ARMSTRONG.